No. 608,187. Patented Aug. 2, 1898.
H. J. DOUGHTY.
PNEUMATIC TIRE.
(Application filed Jan. 11, 1897. Renewed Jan. 4, 1898.)

(No Model.)

Witnesses

Inventor
Henry J. Doughty
Attorneys

UNITED STATES PATENT OFFICE.

HENRY J. DOUGHTY, OF PROVIDENCE, RHODE ISLAND, ASSIGNOR TO THE ATLANTIC RUBBER COMPANY, OF MAINE.

PNEUMATIC TIRE.

SPECIFICATION forming part of Letters Patent No. 608,187, dated August 2, 1898.

Application filed January 11, 1897. Renewed January 4, 1898. Serial No. 665,599. (No model.)

*To all whom it may concern:*

Be it known that I, HENRY J. DOUGHTY, a citizen of the United States, residing at Providence, in the county of Providence and State of Rhode Island, have invented certain new and useful Improvements in Pneumatic Tires, of which the following is a specification.

This invention relates to pneumatic tires for the wheels of bicycles and other vehicles; and it consists, essentially, in the combination, with a wheel-rim, of an inflatable air-tube and a covering or protecting strip extending spirally around the air-tube and provided at a distance from one edge with a non-stretchable securing-hoop, whereby the expansive pressure of the air-tube upon the securing-ring, together with the frictional contact between the overlapping flexible portions of the covering-strip, causes the tire to be securely held in place.

The invention further consists in the novel construction, combination, and arrangement of parts hereinafter more particularly described.

Figure 1:
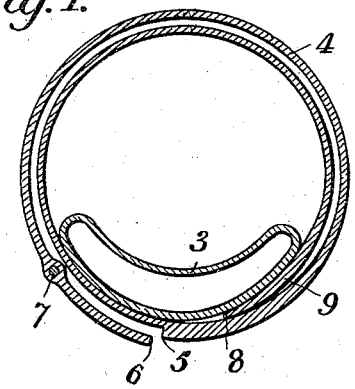
Figure 2:
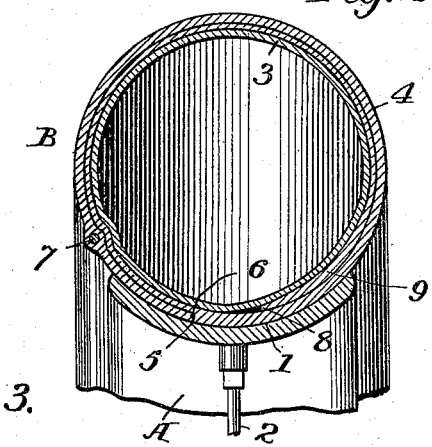
Figure 3:
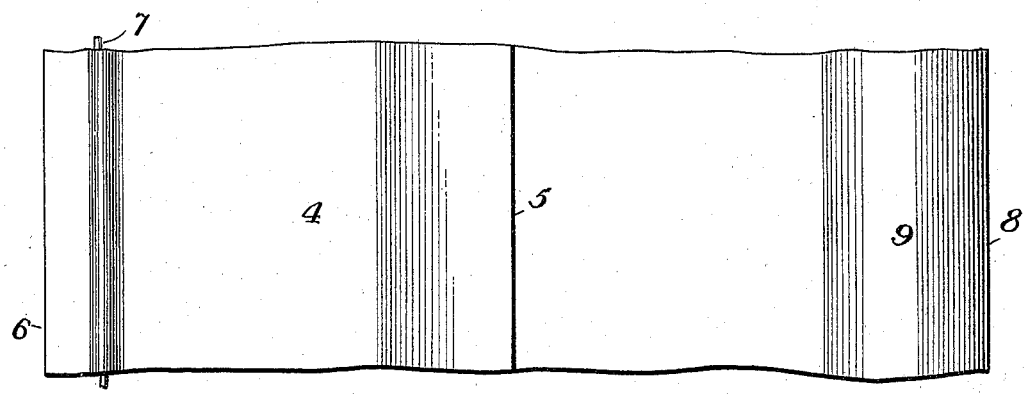
Figure 4:
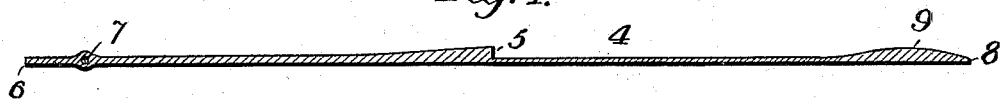
Figure 5:
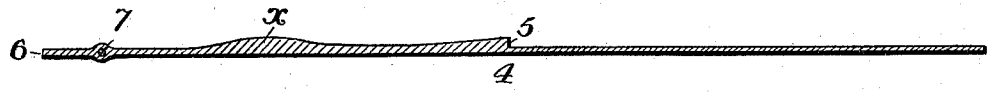
Figure 6:
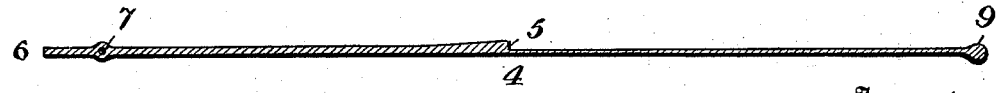

In the accompanying drawings, forming a part of this specification, and in which like letters and numerals of reference indicate corresponding parts, Figure 1 is a cross-sectional view of the invention applied to a wheel-rim with the tire deflated. Fig. 2 is a similar view showing the tire inflated. Fig. 3 is a plan view of a section of the covering or protecting strip. Fig. 4 is a cross-sectional view thereof, and Figs. 5 and 6 are similar views of modifications.

Referring to the drawings, A designates the wheel-rim of any ordinary construction and provided with the usual grooved or concave face 1. The spokes 2 are secured to the rim in any desired way.

B is the tire, comprising an inner inflatable tube 3 and an outer covering or protecting strip 4, adapted to inclose the inner tube and serve as the tread of the wheel.

The inner tube 3 may be formed in any desired way; but preferably it is of the ordinary endless form, constructed of elastic material and provided with the usual inflating-tube.

The outer covering-strip 4 may be formed of any suitable flexible waterproof material and is preferably non-elastic, or it may be formed of a combination of materials, such as rubber and canvas, in which case the canvas strip would be secured to one or both faces of the rubber strip or embedded in it, and the canvas may completely cover the inner or outer face of the strip or only partially cover it, as found desirable. This outer covering is preferably of a width sufficient to extend twice and spirally around the inner tube when it is inflated to its full capacity, and it is provided at or near its center with a longitudinal rib or shoulder 5, which in practice is upon the outer face of the strip 4 and lies within the concave portion 1 of the rim intermediate the said rim and inner tube 3. This shoulder is adapted to serve as a bearing for the edge 6 of the covering. Extending parallel with the edge 6, which is left perfectly flexible, but a distance therefrom, and preferably embedded in the covering-strip, is a securing hoop or ring 7 of nonelastic material, and this securing-ring is located at such a distance from the said edge as to lie without the rim A and parallel to the edge thereof. Near its opposite edge 8, which is also perfectly flexible, the covering-strip 4 is provided with a thickened portion or rib 9, which extends longitudinally of the strip and gradually decreases in thickness to the edge thereof. This thickened portion 9 serves to lock the edge 8 of the covering-strip against movement and prevents it separating or unwrapping from around the inner tube when said tube is inflated. It will be understood, of course, that the frictional contact between the covering-strip and inner tube, caused by the expansive action of said tube, also serves as an additional means to prevent the edge 8 of the covering-strip from unwrapping.

Those portions of the covering-strip lying intermediate the shoulder 5 and securing-ring 7 and between the said ring and rib 9 may be of uniform thickness; but I prefer to form that portion of the strip between the ring 7 and shoulder 5 which forms the extreme outer covering of the tire of greater thickness than that portion of the strip intervening between the shoulder 5 and the securing-rib 9 and which in practice lies intermediate that portion of the strip which forms the extreme outer covering of the inner tube 3 and the said tube itself.

From the above it will be obvious that the covering-strip is wrapped or coiled spirally about the inner tube, and its extreme edges are left flexible and disposed within the concave portion of the wheel-rim intermediate the rim and inner tube, the opposite edges of the strip being separated by an intervening portion or coil of the strip. As thus arranged there is absolutely no liability of dirt or moisture working into and entering the outer covering between the overlapping edge thereof, as would be the case if the edge of the covering-strip were exposed.

Heretofore it has been customary to secure a covering-strip around an air-tube by means of a non-stretchable hoop or band located or attached to the edge of the strip, but when thus arranged the edges of the strip are flexible, and it is necessary that the edge of the covering-strip be overlapped and lie on the outer part or tread of the tire; but this construction is very objectionable, for the reason that sand, dirt, and moisture work under the exposed edges of the covering-strip and tend to destroy and lessen the efficiency of the tire. It has also been customary to provide each of the extreme edges of a covering-strip with a non-extensible securing-ring and to dispose said edges within a wheel-rim; but it is impossible to overlap these edges within the rim, at least to any appreciable extent. By locating a securing hoop or ring at a distance from one edge of the covering-strip said hoop may be disposed outside the wheel-rim, while the edges of the tire-cover are overlapped at a point intermediate the air-tube and wheel-rim and are unexposed and protected.

It will be obvious that the securing-ring 7 is held in its proper position by means of the shoulder 5, against which the edge 6 of the strip normally bears, while by reason of the rib or enlargement 9 and the contiguous narrow portion of the inner coil of the covering-strip, which is pressed out tightly against the inner face of the outer coil or wrap of said strip by the inner air-tube to wedge the enlargement in proper position, the inner edge 8 of the covering-strip is locked against slipping.

In lieu of forming the enlargement 9 near the edge 8 of the covering-strip it may be formed at said edge, as shown in Fig. 6, or the enlargement may be dispensed with altogether, as in Fig. 5, and the friction between the overlapped portions of the covering-strip and between the said strip and inner tube depended upon to prevent slipping of the edge 8. If desired, the outer face of that portion of the covering-strip between the securing-hoop 7 and the shoulder 5 may be formed convex, as indicated at $x$ in Fig. 5, and various other modifications may be made without departing from the spirit of my invention.

What I claim is—

1. A pneumatic-tire cover consisting of a continuous strip, flexible throughout, with a continuous non-stretchable hoop at a distance from one edge leaving a flexible edge portion adapted to overlap the body of the cover within the wheel-rim and the loop disposed wholly without the rim, substantially as described.

2. An annular flexible covering or protecting strip for pneumatic tires provided at a distance from one edge with a non-stretchable securing-hoop, at or near its opposite edge with an enlargement and intermediate said edges with a longitudinal shoulder, substantially as described.

3. In a pneumatic tire, the combination with an inner inflatable air-tube, of a flexible protecting or covering strip therefor, provided intermediate its width with a longitudinal shoulder, and at a distance from one edge with a non-stretchable securing-ring, said edge being adapted to engage said shoulder, while at or near its opposite edge, said strip is provided with an enlargement, substantially as described.

4. In a pneumatic tire, the combination with a wheel-rim having a concave face, of an inner inflatable air-tube, a protecting or covering strip therefor provided at a distance from one edge with a non-stretchable securing-ring, said strip being normally adapted to extend spirally around the inner tube whereby one edge of the strip is brought to lie intermediate the air-tube and the inner face of the strip while the opposite edge lies within the concave portion of the wheel-rim intermediate said rim and the outer face of the covering-strip to bring the securing-ring without the wheel-rim and parallel to one edge thereof, substantially as described.

5. In a pneumatic tire, the combination with a wheel-rim having a concave face, of an inner inflatable air-tube, a protecting or covering strip therefor, flexible throughout, adapted normally to extend spirally around the air-tube, and a non-stretchable securing-ring at a distance from one edge of said protecting-strip, substantially as described.

6. In a pneumatic tire, the combination with a wheel-rim having a concave face, of an inner inflatable air-tube, a protecting or covering strip flexible throughout adapted normally to extend spirally around the air-tube, and a non-stretchable securing-ring at a distance from one edge of the protecting-strip, said ring lying within the concave face of the wheel-rim, while the extreme edge of the protecting-strip lies intermediate said face and the body of the covering-strip, substantially as described.

In testimony whereof I have signed my name to this specification in the presence of two subscribing witnesses.

HENRY J. DOUGHTY.

Witnesses:
ROBERT L. WALKER,
JOSEPH H. CLARK.